(12) United States Patent
Riddle

(10) Patent No.: US 7,626,944 B1
(45) Date of Patent: Dec. 1, 2009

(54) METHODS, APPARATUSES AND SYSTEMS FACILITATING REMOTE, AUTOMATED DEPLOYMENT OF NETWORK DEVICES

(75) Inventor: Guy Riddle, Los Gatos, CA (US)

(73) Assignee: Packeteer, Inc., Cupertino, CA (US)

( * ) Notice: Subject to any disclaimer, the term of this patent is extended or adjusted under 35 U.S.C. 154(b) by 767 days.

(21) Appl. No.: 10/815,405

(22) Filed: Mar. 31, 2004

(51) Int. Cl.
*H04L 12/28* (2006.01)

(52) U.S. Cl. .................. 370/254; 370/401; 709/220

(58) Field of Classification Search .............. 370/254, 370/255, 256, 257, 258, 401; 709/220
See application file for complete search history.

(56) References Cited

U.S. PATENT DOCUMENTS

| | | | | |
|---|---|---|---|---|
| 5,481,539 | A * | 1/1996 | Hershey et al. | 370/312 |
| 5,819,042 | A * | 10/1998 | Hansen | 709/222 |
| 6,012,088 | A * | 1/2000 | Li et al. | 709/219 |
| 6,012,100 | A | 1/2000 | Frailong et al. | |
| 6,041,347 | A * | 3/2000 | Harsham et al. | 709/220 |
| 6,047,322 | A | 4/2000 | Vaid et al. | |
| 6,167,567 | A | 12/2000 | Chiles et al. | |
| 6,286,038 | B1 * | 9/2001 | Reichmeyer et al. | 709/220 |
| 6,341,309 | B1 | 1/2002 | Vaid et al. | |
| 6,353,854 | B1 * | 3/2002 | Cromer et al. | 709/224 |
| 6,366,926 | B1 * | 4/2002 | Pohlmann et al. | 707/104.1 |
| 6,385,648 | B1 * | 5/2002 | Philippou et al. | 709/222 |
| 6,493,871 | B1 | 12/2002 | McGuire et al. | |
| 6,684,241 | B1 * | 1/2004 | Sandick et al. | 709/220 |
| 6,930,984 | B1 * | 8/2005 | Nomura et al. | 370/254 |
| 6,976,163 | B1 | 12/2005 | Hind et al. | |
| 6,990,591 | B1 | 1/2006 | Pearson | |
| 7,281,036 | B1 * | 10/2007 | Lu et al. | 709/220 |
| 7,349,327 | B2 * | 3/2008 | Puon et al. | 370/216 |
| 7,369,996 | B2 * | 5/2008 | Sladden | 704/270.1 |
| 2002/0100036 | A1 | 7/2002 | Moshir et al. | |
| 2002/0191548 | A1 * | 12/2002 | Ylonen et al. | 370/254 |
| 2003/0041125 | A1 * | 2/2003 | Salomon | 709/220 |
| 2003/0061315 | A1 * | 3/2003 | Jin | 709/220 |
| 2003/0110276 | A1 * | 6/2003 | Riddle | 709/230 |
| 2003/0204574 | A1 * | 10/2003 | Kupershmidt | 709/220 |
| 2004/0083298 | A1 * | 4/2004 | El Mghazli et al. | 709/230 |
| 2004/0088385 | A1 * | 5/2004 | Blanchet et al. | 709/220 |
| 2004/0107292 | A1 * | 6/2004 | El Mghazli et al. | 709/232 |
| 2004/0199611 | A1 * | 10/2004 | Bernhard et al. | 709/220 |
| 2004/0240397 | A1 * | 12/2004 | Aures et al. | 370/254 |
| 2004/0264395 | A1 * | 12/2004 | Rao | 370/311 |

(Continued)

FOREIGN PATENT DOCUMENTS

WO    WO03026255 A1 * 3/2003

OTHER PUBLICATIONS

Extending Network Management Through Firewalls; S Hochstetler, H Tanner, R Kulkarni, S Mika—2001.*

(Continued)

*Primary Examiner*—Edan Orgad
*Assistant Examiner*—Salman Ahmed
(74) *Attorney, Agent, or Firm*—Baker Botts L.L.P.

(57) ABSTRACT

Methods, apparatuses and systems facilitating remote deployment of network devices. Implementations of the present invention enable deployment workflows that reduce the costs associated with installing and configuring network devices on computer networks. Other implementations of the present invention enable an automated, remote deployment and configuration system for network devices.

24 Claims, 5 Drawing Sheets

U.S. PATENT DOCUMENTS

| | | | |
|---|---|---|---|
| 2005/0013255 A1* | 1/2005 | Knop et al. | 370/241 |
| 2005/0047326 A1* | 3/2005 | Puon et al. | 370/216 |
| 2005/0135268 A1* | 6/2005 | Simon et al. | 370/254 |
| 2005/0185611 A1* | 8/2005 | Torarp et al. | 370/328 |
| 2005/0286722 A1* | 12/2005 | Aboba et al. | 380/277 |
| 2006/0080425 A1* | 4/2006 | Wood et al. | 709/223 |
| 2006/0168238 A1* | 7/2006 | Massam et al. | 709/227 |
| 2006/0187853 A1* | 8/2006 | Mititelu | 370/254 |
| 2006/0209714 A1* | 9/2006 | Ackermann-Markes et al. | 370/254 |
| 2007/0097885 A1* | 5/2007 | Traversat et al. | 370/254 |
| 2009/0141721 A1* | 6/2009 | Filsfils | 370/392 |

OTHER PUBLICATIONS

Architecture and implementation of a remote management framework for dynamically reconfigurable devices; Chakravorty, R.; Ottevanger, H.; Networks, 2002. ICON 2002. 10th IEEE International Conference on Aug. 27-30, 2002 pp. 375-380.*

Author Unknown,"Dynamic Linking and Loading," Archive.org date: Sep. 28, 2000. Accessed from: http://www.iecc.com/linker/liner10.html on Mar. 30, 2006.

Freir, et al. "The SSL Protocol Version 3.0 <draft-freier-ssi-version3-02.txt>", published Nov. 18, 1996.

Yavatkar, et al., "RFC 2753: A framework for Policy-Based Admission Control." Published Jan. 2000.

Durham, et al., "RFC 2748: The COPS Protocol." Published Jan. 2000.

Simson Garfinkel. Web Security & Commerce, copyright 1997, O'Reilly & Associates, Inc., Chapters 6.2 and 8.1.

Burnett, Steve and Paine, Stephen, *RSA Security's Official Guide to Cryptography*, "Public-Key Cryptography and the Digital Envelope", pp. 88-91, The McGraw-Hill Companies, 2001.

"Cryptography", from Wikipedia, the free encylopedia, downloaded Nov. 6, 2007, http://en.wikipedia.org/wiki/Cryptography.

* cited by examiner

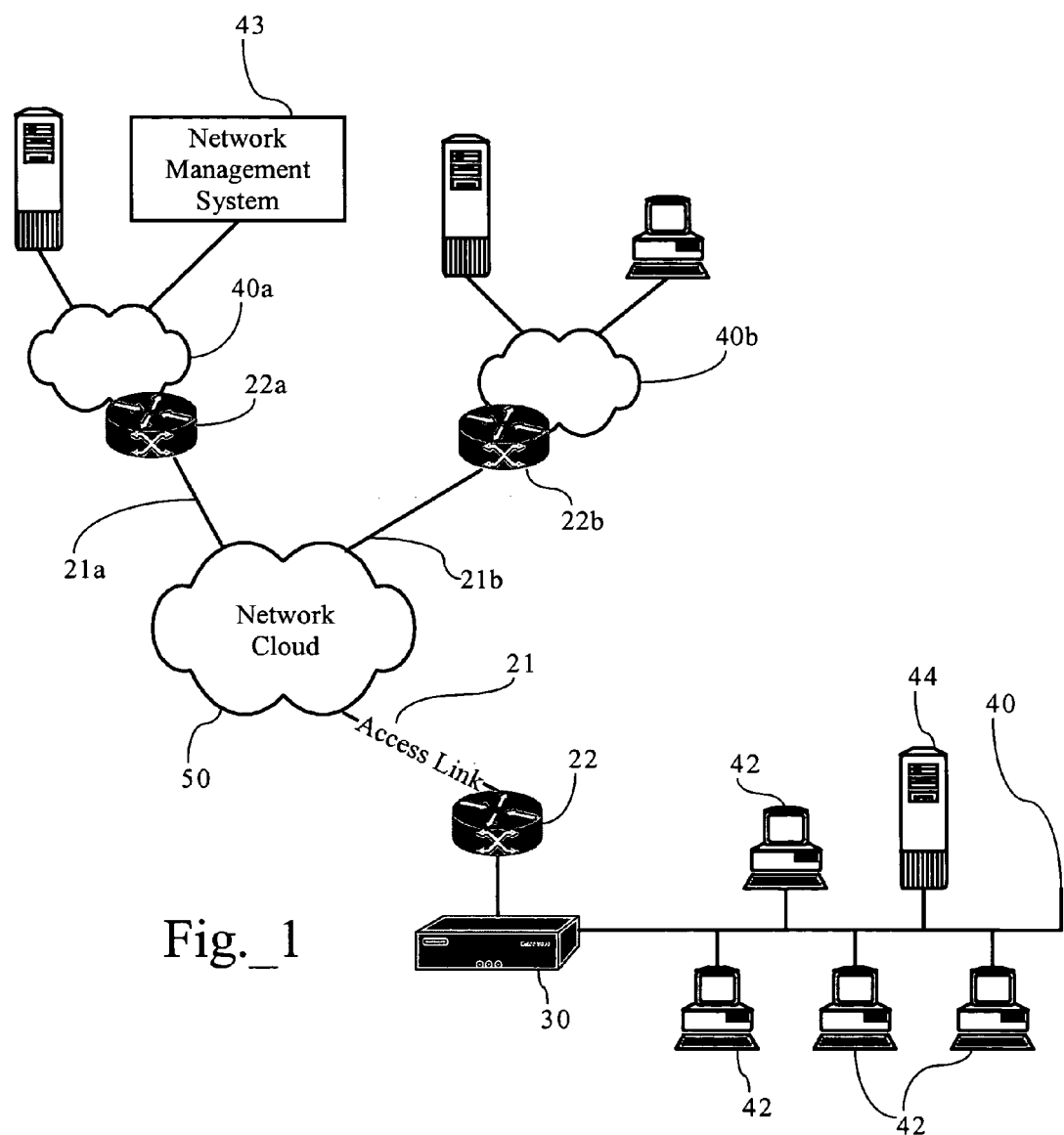
Fig._1

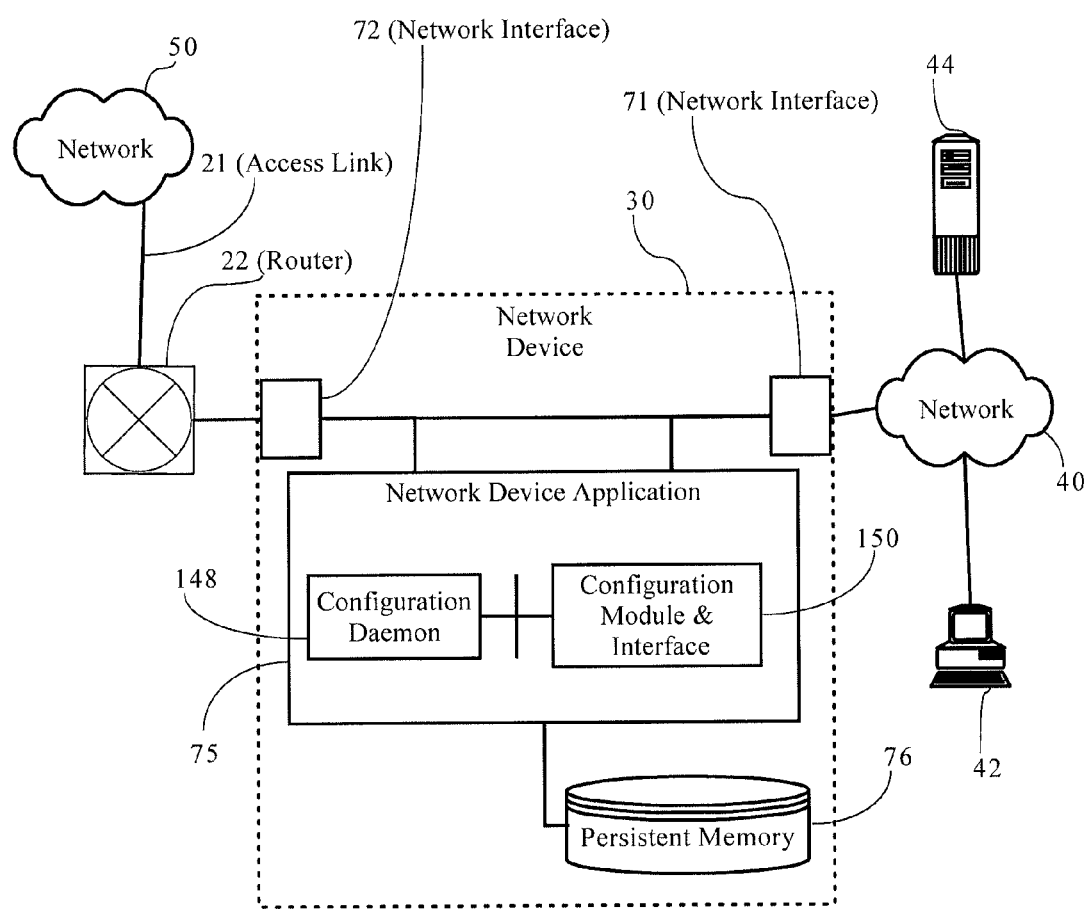
Fig._2

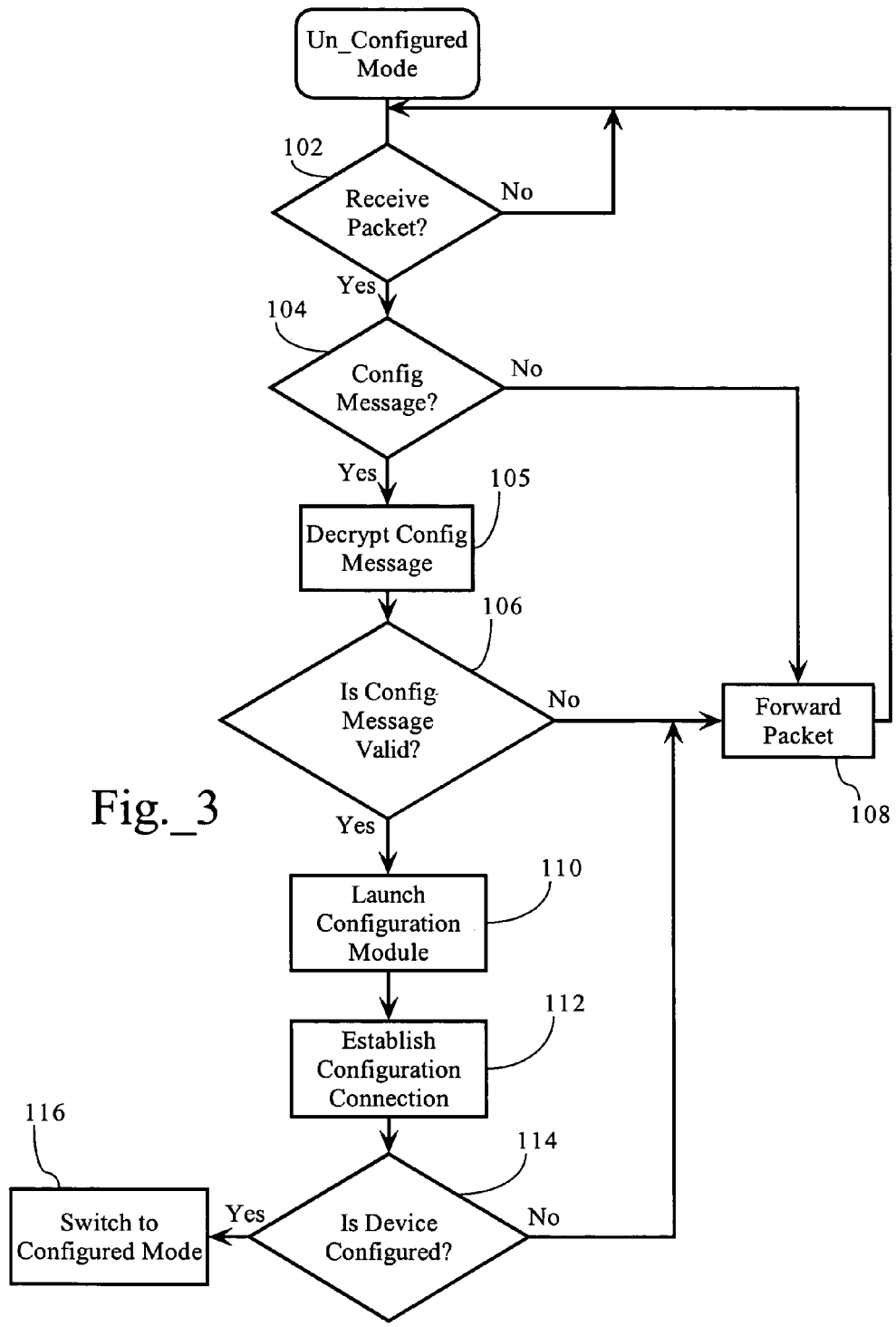
Fig._3

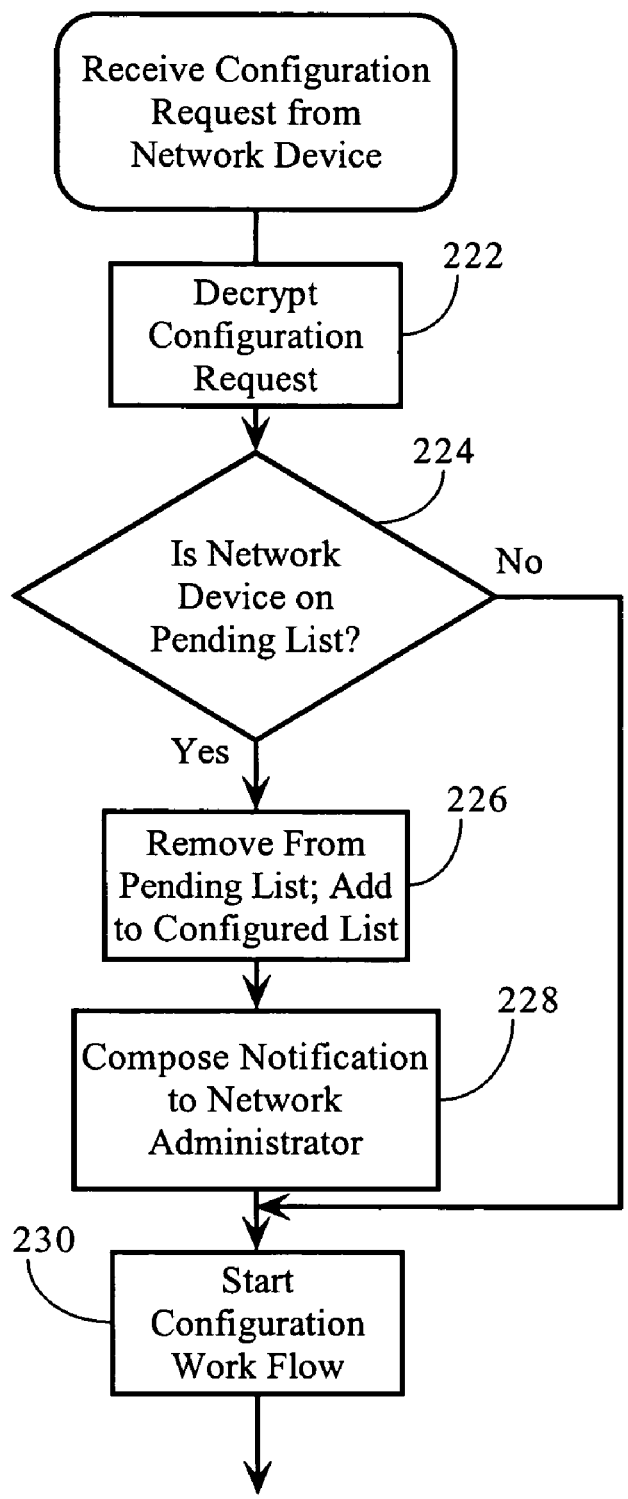
Fig._4B

METHODS, APPARATUSES AND SYSTEMS FACILITATING REMOTE, AUTOMATED DEPLOYMENT OF NETWORK DEVICES

FIELD OF THE INVENTION

The present invention relates to computer networks and, more particularly, to methods, apparatuses and systems facilitating remote, automated deployment and configuration of network devices.

BACKGROUND OF THE INVENTION

Enterprises have become increasingly dependent on computer network infrastructures to provide services and accomplish mission-critical tasks. Indeed, the performance, security, and efficiency of these network infrastructures have become critical as enterprises increase their reliance on distributed computing environments and wide area computer networks. To that end, a variety of network devices have been created to provide data gathering, reporting, and/or operational functions, such as firewalls, gateways, packet capture devices, bandwidth management devices, application traffic monitoring devices, and the like. For example, the TCP/IP protocol suite, which is widely implemented throughout the world-wide data communications network environment called the Internet and many wide and local area networks, omits any explicit supervisory function over the rate of data transport over the various devices that comprise the network. While there are certain perceived advantages, this characteristic has the consequence of juxtaposing very high-speed packets and very low-speed packets in potential conflict and produces certain inefficiencies. Certain loading conditions degrade performance of networked applications and can even cause instabilities which could lead to overloads that could stop data transfer temporarily. In response, certain data flow rate control mechanisms have been developed to provide a means to control and optimize efficiency of data transfer as well as allocate available bandwidth among a variety of business enterprise functionalities. For example, U.S. Pat. No. 6,038,216 discloses a method for explicit data rate control in a packet-based network environment without data rate supervision. Data rate control directly moderates the rate of data transmission from a sending host, resulting in just-in-time data transmission to control inbound traffic and reduce the inefficiencies associated with dropped packets. Bandwidth management devices allow for explicit data rate control for flows associated with a particular traffic classification. For example, U.S. Pat. No. 6,412,000, above, discloses automatic classification of network traffic for use in connection with bandwidth allocation mechanisms. U.S. Pat. No. 6,046,980 discloses systems and methods allowing for application layer control of bandwidth utilization in packet-based computer networks. For example, bandwidth management devices allow network administrators to specify policies operative to control and/or prioritize the bandwidth allocated to individual data flows according to traffic classifications. In addition, network security is another concern, such as the detection of computer viruses, as well as prevention of Denial-of-Service (DoS) attacks on, or unauthorized access to, enterprise networks. Accordingly, firewalls and other network devices are deployed at the edge of such networks to filter packets and perform various operations in response to a security threat. In addition, packet capture and other network data gathering devices are often deployed at the edge of, as well as at other strategic points in, a network to allow network administrators to monitor network conditions.

Enterprises network topologies can span a vast array of designs and connection schemes depending on the enterprise's resource requirements, the number of locations or offices to connect, desired service levels, costs and the like. A given enterprise often must support multiple LAN or WAN segments that support headquarters, branch offices and other operational and office facilities. Indeed, enterprise network design topologies often include multiple, interconnected LAN and WAN segments in the enterprise's intranet, and multiple paths to extranets and the Internet. Enterprises that cannot afford the expense of private leased-lines to develop their own WANs, often employ frame relay, or other packet switched networks, together with Virtual Private Networking (VPN) technologies to connect private enterprise sites via a service provider's public network or the Internet. Some enterprises also use VPN technology to create extranets with customers, suppliers, and vendors. These network topologies often require the deployment of a variety of network devices at each remote facility. In addition, some network systems are end-to-end solutions, such as application traffic optimizers using compression tunnels, requiring network devices at each end of a communications path between, for example, a main office and a remote facility.

The deployment, configuration and management of enterprise networks often requires specially-trained personnel tasked with installing and maintaining the network devices implementing or supporting the networks. For example, after physical installation of the network device, a network administrator typically must access a configuration interface to provide initial configuration information, such as an IP address and subnet mask. Accordingly, the cost and ability to manage and maintain enterprise networks can become problematic, especially for enterprises with a number of remote facilities. For example, the deployment and configuration of a given network device often requires an enterprise, or network service provider, to send out skilled personnel to perform the required installation and configuration tasks. In large enterprise networks, the ability to, as well as the costs associated with, deploying a large number of network devices can become problematic. While some network devices include functionality (such as Layer 2 discovery mechanisms) allowing them to be automatically configured by a network management device after physical installation on a network, these automated deployment mechanisms are typically limited to local installations where the configuring system and the newly-deployed network device are on the same subnetwork. Given the vast array of enterprise network topologies discussed above, methods, apparatuses and systems are required to facilitate automated, remote deployment of network devices. Embodiments of the present invention substantially fulfill this need. The deployment, configuration and management of enterprise networks further requires network security, which may entail encryption of key network configuration parameters or messages. As shown by those of skill in the art, there are two primary types of encryption algorithms, known as "symmetric encryption" or "asymmetric encryption" algorithms. Symmetric cryptography, also known as "secret key cryptography," is a system in which a single secret key is used to encrypt or decrypt a message. It is symmetric in the sense that both sender and receiver have the same key, and senders can decrypt any message sent to the receiver using the secret key. Asymmetric cryptography is also known in the art as "public-key cryptography." A common public-key system is known as the "RSA public key cryptosystem," See Thomas H. Cormen, Charles E. Leiserson, Robert L. Rivest, and Clifford Stein, *Introduction to Algorithms, Second Edition,* MIT Press and McGraw-Hill, 2001, ISBN 0-262-03293-7, Section 31.7: *The RSA public-key cryptosystem,* pp. 80-81. In a public-key cryptography system, a user has two keys, a private key and a public key. The private key is kept secret, while the public key may be widely distributed to various potential senders. The private key cannot be determined in a practical manner from the public key, and a message encrypted with the public key can be decrypted only with the private key. Thus, access to keys and messages is asymmetric, in that the senders have a different key from the receiver, and only the receiver can decrypt the various sent messages. This ensures the various users of confidentiality. Various asymmetric encryption algorithms are described in Alfred Menezes, Paul C. van Oorschot, and Scott A. Vanstone, *Handbook of Applied Cryptography,* CRC Press, October 1996, ISBN 0-8493-8523-7, and R. Rivest, A. Shamir, and L. Adleman, *Method for Obtaining Digital Signatures and Public-Key Cryptosystems,* Communications of the ACM, Vol. 21 (2), pp. 120-126, 1978.

SUMMARY OF THE INVENTION

The present invention provides methods, apparatuses and systems facilitating remote deployment of network devices. Implementations of the present invention enable deployment workflows that reduce the costs associated with installing and configuring network devices on computer networks. Other implementations of the present invention enable an automated, remote deployment and configuration system for network devices. The present invention can be used to configure a wide variety of network devices, including firewalls, proxies, application traffic management appliances, packet capture devices, network monitoring appliances, and the like.

DESCRIPTION OF THE DRAWING(S)

FIG. 1 is a schematic diagram illustrating a computer network including a network device according to an implementation of the present invention.

FIG. 2 is a functional block diagram illustrating the functionality of a network device according to an implementation of the present invention.

FIG. 3 is a flow chart diagram providing a method, according to an embodiment of the present invention, illustrating the operation of a network device in an unconfigured state.

FIG. 4B is a flow chart diagram providing a method, according to an embodiment of the present invention, directed to receiving messages from remote network devices.

DESCRIPTION OF PREFERRED EMBODIMENT(S)

Figure 4A:
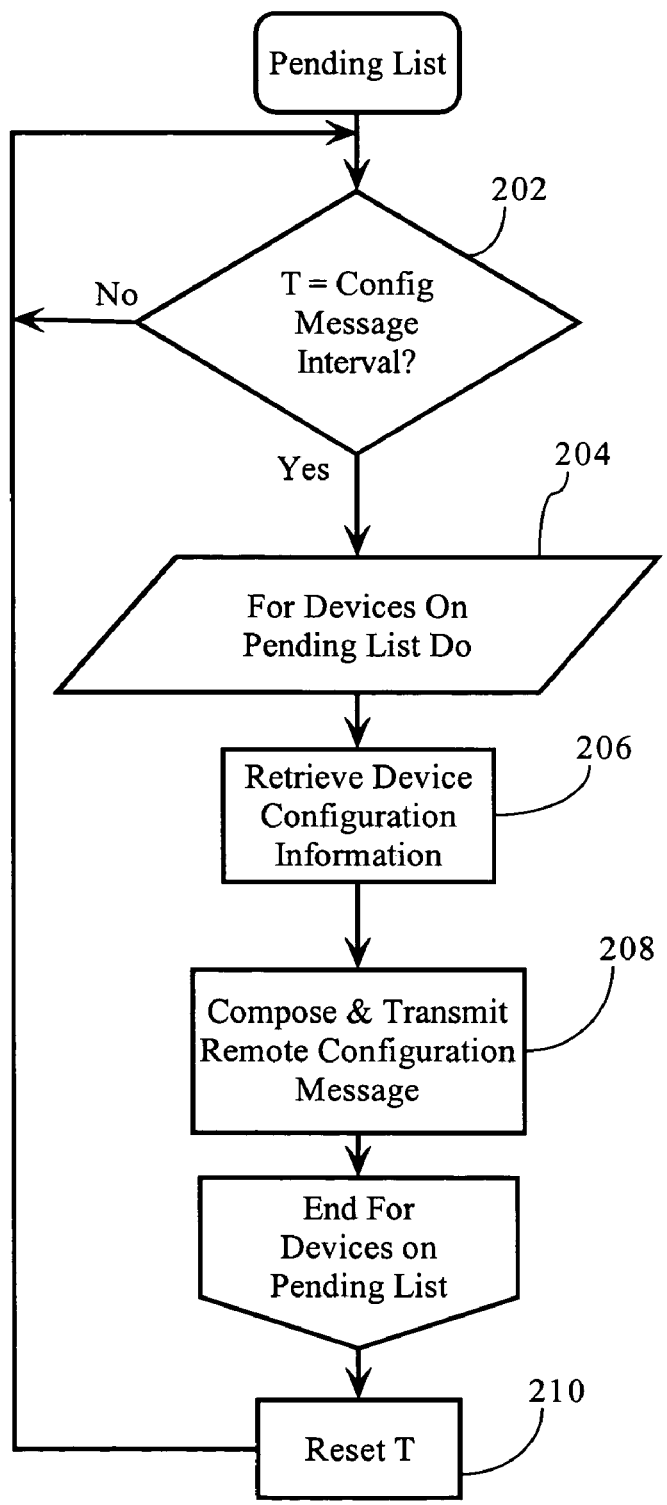
FIG. 4A is a flow chart diagram illustrating a method, according to an embodiment of the present invention, directed to transmitting initial configuration messages to remote devices.

FIG. 1 illustrates a network environment in which embodiments of the present invention may operate. As FIG. 1 shows, network 40 interconnects several TCP/IP end systems, including client devices 42 and server device 44, and provides access to resources operably connected to computer network 50 via router 22 and access link 21. Access link 21 is a physical and/or logical connection between two networks, such as computer network 50 and network 40. The computer network environment, including network 40 and computer network 50 is a packet-based communications environment, employing TCP/IP protocols, and/or other suitable protocols, and has a plurality of interconnected digital packet transmission stations or routing nodes. Network 40 can be a local area network, a wide area network, or any other suitable network. As FIG. 1 also illustrates, network device 30, in one implementation, is deployed at the edge of network 40. In one implementation, network device 30 is a network application traffic management device operative to manage data flows traversing access link 21. However, the automated, remote deployment functionality according to the present invention can be integrated into a variety of network devices, such as proxies, firewalls, packet capture or network monitoring equipment, VPN servers, web services network gateways or brokers, and the like. As FIG. 1 illustrates, network 50 interconnects networks 40, 40b which may be networks supporting branch office facilities, and network 40a, which may support a central operating or headquarters facility. FIG. 1 also shows a network management system 43 operably connected to network 40a. In one embodiment, network management system 43 is a server or other computing device that hosts a network management application operative to facilitate management and configuration tasks associated with a plurality of network devices. In one implementation, network management system 43 supports a Lightweight Directory Access Protocol (or other) interface allowing network device 30 to establish remote connections for the exchange of configuration information. In implementations, where network device 30 is a network application traffic monitoring and/or management device, the application hosted by network management system 43 may be the PolicyCenter™ management application (offered by Packeteer, Inc. of Cupertino, Calif.) which is operative to manage and propagate configuration information to a plurality of PacketShaper® bandwidth or application traffic management devices and/or PacketSeeker® application traffic monitoring devices. Furthermore, although not shown in FIG. 1, additional network devices may be deployed at the edge of networks 40a, 40b, as well.

As discussed more fully below, network management system 43, during a configuration phase, is operative to periodically transmit configuration messages to network device 30 until network device 30 responds. Network device 30, in an unconfigured mode, is operative to monitor for configuration messages, forwarding other packets along the communications path to or from network 40. A variety of deployment configurations are possible. FIGS. 1 and 2 show deployment of network device 30 between router 22 and a network 40 (comprising a hub, switch, router, and/or a variety of combinations of such devices implementing a LAN or WAN) interconnecting a plurality of end-systems (here, client computer 42 and server 44). Alternatively, in other implementations, network device 30 may itself be an end system connected to network 40. Still further, network device 30 may be connected to mirror ports as opposed to the communications path between router 22 and network 40.

As FIG. 2 illustrates, network device 30, in one implementation, comprises network device application 75, and first and second network interfaces 71, 72, which operably connect network device 30 to the communications path between router 22 and network 40. Network device application 75 generally refers to the functionality implemented by network device 30, such as network monitoring or reporting, application traffic management, security, virtual-private networking, and the like. In one embodiment, network device application 75 is a combination of hardware and software, such as a central processing unit, memory, a system bus, an operating system and one or more software modules implementing the functions performed by network device, as well as the automated deployment and configuration functionality described herein. In one embodiment, first and second network interfaces 71, 72 are implemented as a combination of hardware and software, such as network interface cards and associated software drivers. In addition, the first and second network interfaces 71, 72 can be wired network interfaces, such as Ethernet (IEEE 802.3) interfaces, and/or wireless network interfaces, such as IEEE 802.11, BlueTooth, satellite-based interfaces, and the like. As FIG. 2 illustrates, network device 30, in one embodiment, includes persistent memory 76, such as a hard disk drive or other suitable memory device, such writable CD, DVD, or tape drives. Network device 30 can include additional network interfaces to support additional access links or other functionality.

Network device application 75, in one implementation comprises configuration daemon 148 and configuration interface module 150. Configuration daemon 148 listens for configuration messages, validates configuration messages, and, when a valid configuration message is received, invokes configuration interface module 150. Configuration interface module 150 includes functionality directed to the configuration of network device 30. For example, configuration interface module 150 supports application programming, web-based, and/or command line interfaces that allow for the configuration of the operational and other parameters of network device, such as a device name, IP address, subnet mask. In one implementation, configuration interface module 150 is operative to establish connections to remote systems, such as network management system 43, to receive configuration information, such as operational parameters and settings.

According to certain implementations of the present invention, deployment of network device 30 generally comprises two main tasks: 1) physical installation of network device 30 on network 40; and 2) configuration of network management system 43 to transmit configuration messages to the network 40. In one implementation, to physically install network device 30, a user simply connects appropriate cabling to network interfaces 71, 72. In one implementation, network interfaces comprise RJ-45 or other suitable connectors that accept CAT-5 cables. Network device 30 may further include a separate power cable or may be powered over the same data cabling according, for example, to the 802.3af (Power over Ethernet) standard. One skilled in the art will recognize that the physical installation of network device 30 may vary depending on the nature of the functions performed and the number of network interfaces associated with network device 30. For example, as discussed above, network device 30 may include additional or fewer network interfaces. In any event, after physical installation, the user powers the network device 30. In one implementation, network device 30 has no Internet Protocol (IP) or other network address before it is configured and, thus, has no capability to communicate with hosts on other networks, such as network management system 43; however, as discussed more fully below, network device 30 monitors for initial configuration messages that include configuration information sufficient to communicate with network management system 43 and be automatically and remotely configured. In other embodiments, network device 30 may obtain a dynamic IP address from Dynamic Host Configuration Protocol (DHCP) functionality implemented On network 40. In either embodiment, network device 30 monitors for configuration messages in an un-configured mode. As discussed below, the network device 30 may receive initial configuration information, such as the network address of network management system 43.

A. Network Management System and Initial Configuration Messages

Subsequent to, or before, physical installation of network device 30 on network 40, a network administrator, configures network management system 43 with the initial configuration information for the newly installed network device 30. Configuration information for network device 30 can include: 1) a network device identifier, 2) an IP address for the network device; 3) the subnet mask corresponding to network 40; and 4) the IP address of the gateway router 22 associated with network 40. Other configuration information can include the IP address of network management system 43, and a password allowing access to network management system 43. In one implementation, the network administrator also specifies the IP address of a destination host to which the initial configuration message is addressed. In addition, a network administrator may also select one or more files including additional configuration information to be provided to network device 30 after it has been initially configured to communicate with network management system 43.

In one implementation, network management system 43 adds the specified network device 30 to a pending List. As FIG. 4A illustrates, network management system 43 periodically transmits configuration messages associated with network devices on its pending list, as discussed more fully below, until a given network device responds back. Specifically, as FIG. 4A illustrates, network management system 43, at a predetermined interval (202), retrieves the network device configuration information corresponding to a network device on the pending list (206), and transmits a configuration message including configuration information specified by the network administrator (208). Network management system 43 repeats this process for the network devices on the pending list (204, 210). The configuration message interval can be any suitable value and, in one implementation, may be a configurable parameter.

When a given network device 30 responds to the initial configuration message, in one implementation, configuration interface module 150 of network device 30 establishes a connection by transmitting a configuration request (e.g., an LDAP request, an HTTP request, etc.) to network management system 43. In one implementation, the configuration request includes the network device name and password provided in the initial configuration message. In one implementation, this information is encrypted using the same encryption keys, as discussed below. In one implementation, when network management system 43 receives a configuration request, it retrieves the encryption key corresponding to the source IP address in the configuration request and decrypts the configuration request (222). Using either the source IP address or the network device identifier in the configuration request, network management system 43 then determines whether the network device 30 is on the pending list (224). If so, network management system 43, in one implementation, removes network device 30 from the pending list and adds it to a configured list (226). In one implementation, network management system 43 can perform other actions as well, such as, notifying a network administrator (228). Otherwise, network management system 43 initiates a standard configuration work flow (230)—that is, the configuration request, in one implementation, is handled similarly to configuration requests from previously configured network devices. For example, network device 30 both in this instance and in subsequent configuration sessions pulls its configuration information from network management system 43, writing the retrieved configuration information into its files and memory structures as appropriate.

Other connection protocols are also possible. For example, network management system 43 may respond to configuration requests with a challenge response asking for a network device identifier and password. This authentication handshake can be encrypted using any suitable protocols, such as Secure Sockets Layer (SSL) or other protocols, obviating the need to encrypt the configuration request transmitted by network device 30. Still further, network device 30 may respond to the initial configuration message by transmitting a response to the initial configuration message, as opposed to initiating a connection.

Furthermore, one skilled in the art will recognize that the deployment workflow, according to one implementation of the present invention, allows for the physical installation of network device 30 before or after configuration of network management system 43 with the configuration information corresponding to network device 30. Furthermore, the deployment workflow does not require the personnel performing the physical installation of network device 30 to be in telephonic or other contact with the user performing the configuration at network management system 43. In one implementation, network management system 43 can be configured to notify the network administrator of a possible configuration error if the network device remains on the pending list after a threshold number of attempts or a threshold period of time.

In other implementations, configuration messages can be sent out manually. For example, network management system 43 may provide a command line interface allowing a network administrator to specify configuration information and transmit a configuration message. In one implementation, there is one CLI command with two forms, "sys goose", which may be used to transmit configuration messages.

```
sys goose <device-ip-address> <netmask> <unit-
    name> <gateway> <ms-ip-address> <password>
    [<target>]

sys goose+"<extra-commands>"
```

As the above CLI command demonstrates, the configuration information in the configuration message, in one implementation, includes the network address for network device 30, the subnet mask, a network device identifier, the network address of the gateway router 22, the network address of network management system 43, and a password. The following provides, for didactic purposes, an example of the CLI commands and configuration information that can be employed.

```
sys goose 172.21.18.211 255.255.0.0 bart
    172.21.0.1172.21.19.71 admin 172.21.18.201 sys goose+"setup dns 10.1.1.16|setup domain
    packeteer.com|setup timezone LosAngeles|setup
    sntp on"
```

The first command sends a configuration message along the path from the network management system 43 to <target>, in this case 172.21.18.201. If the user omits <target>, the message is sent, in one implementation, as a subnet broadcast to the subnet on which the network device has been deployed, in this case 172.21.255.255. In addition, the first command, in most implementations, contains all that is necessary to initiate a connection to network management system 43. For example, the first CLI command contains the IP address (<device-ip-address>) and subnet mask (<netmask>) for network device 30, the IP address of gateway router 22 (<gateway>), and the IP address of network management system 43 (<ms-ip-address>). The configuration message may further include a network device identifier (<unit-name>), and a password (<password>), allowing network management system 43 to authenticate any responsive configuration message, or simply to set the password required for any further configuration of network device 30. In addition, the second CLI command in the example above ("sys goose+") allows a network administrator to save "extra" CLI commands, included in the initial configuration message, to be executed by network device 30 immediately after the initial configuration is set. In one implementation, the use of the "sys goose+<extra commands>" is used to address a maximum CLI command length supported by network management system. In one such implementation, the "sys goose+<extra commands>" command must be issued to store the "extra commands" information in memory, before issuing the sys goose CLI command that causes a configuration message to be transmitted.

A.1. Initial Configuration Messages

As discussed herein, configuration messages, in one implementation, are transmitted along the path from network management system 43 to a destination host on the other side of the newly installed network device 30, such as server 44 (see FIG. 1). Only network devices 30, operating in an unconfigured mode, monitor for and process the configuration messages, as described more fully below.

Configuration messages can be implemented using any suitable protocol and technology. In one embodiment, the present invention takes advantage of existing Resource ReSerVation Protocol (RSVP) signaling technologies to transmit initial configuration messages. [See Braden et al., "Resource ReSerVation Protocol (RSVP)—Functional Specification", RFC 2205, September 1997; incorporated by reference herein.] Specifically, one implementation of the present invention extends existing RSVP protocols to transmit initial configuration messages. Extensions of other existing protocols and technologies, which are generally innocuous, or ignored by end systems, can be employed to transmit initial configuration messages. Other suitable protocols include the Internet Control Message Protocol (ICMP) (RFC 792), ECHO (RFC 862/STD-20), and DISCARD (RFC 863/STD-21).

For example and in one embodiment, network management system 43 formulates an initial configuration message as an RSVP PATH message of the null service type and transmits the RSVP PATH message to either a destination host on the other side of network device 30 or the broadcast address of the subnet to which the network device is connected. See Bernet et al., "Specification of the Null Service Type", RFC 2997, November 2000; incorporated by reference herein. In one form, network management system 43 offers the null service type in the ADSPEC object and adds a reference to the null service type in the SENDER_TSPEC object included with the RSVP PATH message. Network management system 43 includes a policy element in a POLICY-DATA object associated with the RSVP PATH message relating to the configuration information. See Herzog, "RSVP Extensions for Policy Control", RFC 2750, January 2000; incorporated by reference herein.

For example, the policy element in the policy data object includes a network device identifier, an IP address of the network device 30, the subnetwork mask of network 40, the IP address of gateway router 22, the IP address of network management system 43, a password for access to network management system 43, and any other suitable configuration parameters or CLI commands, as discussed above. In one implementation, the configuration information may also include a time stamp corresponding to the time when the configuration message was composed by network management system 43. Network device 30, in one implementation, can use this information to determine whether the validity of the configuration message has expired by comparing the difference between time stamp and the current time to a threshold period of time. In one implementation, the configuration information in the configuration message may be formatted as a string of text, such as a comma-delimited string of text.

Routing nodes that do not include the null-service-type that adhere to the RSVP specification simply pass the RSVP PATH message on to the next routing node or other network device in the communication path. Null-service-enabled routing nodes or other network devices, such as network device 30, along the path interpret the RSVP PATH message as requesting no specific service type or quantifiable resource. Rather, null-service-enabled network devices, in their unconfigured mode, operate to validate configuration messages as discussed above. The destination host, assuming it has no RSVP and/or configuration capabilities, simply discards the RSVP PATH message.

In one implementation, encryption and message digest technologies can be employed to protect access to configuration data, and ensure that network device 30 responds to configuration messages only from authorized sources. For example, the policy data element in the RSVP PATH message, in one implementation, may include a string of configuration information and a hashed digest (e.g., MD5 digest) of the configuration information. Use of the MD5 message-digest algorithm results in a fixed length message digest of 128-bits. See Rivest, "The MD5 Message-Digest Algorithm" RFC 1321 (April 1992), incorporated by reference herein. In addition, the string of configuration information and the message digest may be encrypted using DES encryption, triple DES encryption, block-chaining DES encryption, or any other suitable encryption algorithm. In one implementation, the DES or other encryption key contains the following components: 1) a random number, 2) a secret string, and 3) the <target> IP address to which the configuration message is addressed. In one implementation, the random number in the encryption key is stored in the Logical Interface Handle field of the RSVP_HOP object in the POLICY_DATA object. In one implementation, the random number is 32-bits in length; however, any suitable length can be used. The secret string is hard-coded, or otherwise preconfigured in network device 30. As discussed above, the <target> IP address is the network address of the destination host specified in the initial configuration message. According to this implementation, network device 30, as well as network management system 43, construct the encryption key by concatenating these values in a predetermined order. As discussed more fully below, network device 30 constructs the key, and validates the configuration message, in one implementation, by decrypting the policy data element in the RSVP PATH message and validating the decrypted string of configuration information against the message digest. Use of the random number and/or the <target> IP address creates encryption keys that are unique to network device 30.

In other implementations, alternative encryption key components can be used. For example, the secret string can be unique to different types, classes, or groups of network devices. In one implementation, the secret string can be a random string stored on network device 30 during the manufacturing process. In another implementation, additional key components can include the network device serial number of MAC address associated with a network interface. In other implementations, the encryption key may further include a time stamp, as with the random number the time stamp value can also be included in plain text in the RSVP PATH message. Still further, alternative encryption schemes involving asymmetric (or public key) encryption algorithms can be used, where the configuration information (or the symmetric encryption keys) are encrypted using a private key associated with network management system 43. In such an implementation, the network device 30 is configured with a public key and is able to decrypt the configuration information (or the encryption keys).

B. Network Device Configuration

FIG. 3 illustrates a method, according to one implementation of the present invention, performed by network device 30 after power is activated, but before it has been initially configured. As FIG. 3 illustrates, configuration daemon 148 of network device 30, in the unconfigured state, monitors for packets received at network interfaces 71, 72 (102), forwarding on packets other than initial configuration messages (see 104, 108). Specifically, when a configuration message is received (104), configuration daemon 148 decrypts the policy data element in the configuration message (in implementations where the configuration message is encrypted) (105) and validates the message (106), as described more fully below. If the configuration message is valid, configuration daemon 148 invokes configuration interface module 150, passing the configuration information contained in the received message (110). If the configuration message is not valid, configuration daemon 148 assumes the message is not intended for it and forwards along the communications path (108). Once network device 30 is initially configured using the information in the message, in one implementation, it establishes a connection with network management system 43 or another device specified in the initial configuration message (112) to receive additional configuration information.

As FIG. 3 illustrates, after network device 30 has been successfully configured (114), it switches to configured mode (116), forwarding on any subsequent configuration messages. However, if the configuration connection is unsuccessful, network device 30 assumes that the configuration message was not intended for it and forwards it along the communications path. In another implementation, the configuration message can be copied and forward along the communications path before it is validated. In such an implementation, the network device 30 proceeds to validate its copy of the configuration message as described above, while configuration message is forwarded along the communications path to the destination host. As discussed above, other intermediate network devices and end systems in the communications path will either ignore the configuration message or process it, assuming it includes the configuration functionality described herein.

In one implementation, the initial configuration message includes information sufficient for network device 30 to establish a logical connection with (or otherwise transmit messages to) network management system 43. To establish a connection to receive additional configuration information, in one implementation, network device 30 may establish a Lightweight Directory Access Protocol (LDAP) connection with network management system 43. The initial LDAP request, in one implementation, may include the network device identifier and the password included in the initial configuration message. Once this connection is established, network device 30 can receive additional configuration information. For example, if network device 30 is an application traffic monitoring appliance, for example, network device 30 may receive data characterizing a hierarchical traffic classification configuration against which data flows traversing network device 30 are classified. In one implementation, the same IP address is assigned to network interfaces 71, 72. In other implementations, different IP addresses are used at each of network interfaces 71, 72. In such an implementation, the initial configuration information need only include an IP address for outside network interface 72. The IP address for network interface 71 can be optionally included in the initial configuration message, or can be subsequently acquired when network device 30 connects to network management system 43.

Other implementations are possible. For example, in one implementation, the responsive message transmitted by network device 30 can be a direct response to the initial configuration message according to a two-way message protocol (e.g., HTTP, etc.), or a separate message. In one embodiment, the responding network device 30 can transmit a configuration response message to network management system 43 as a RSVP RESV message. In one embodiment, the RSVP RESV message includes a FLOWSPEC and/or other suitable objects requesting the null service and having attributes such as the IP address of the responding network device, the network device identifier, passwords, digital signatures, and the like. Of course, the responsive configuration message could be implemented using a different protocol entirely.

Network device 30 may validate the configuration message in a number of different ways. For example, assuming the configuration message is encrypted, a first validation step is to construct the encryption key, as discussed above, and decrypt the cipher text. To validate the configuration message, configuration daemon 148 recreates the message digest using the string in the policy data element of the RSVP PATH message and compares the message digest to the digest in the initial configuration message.

In a second (or alternative) validation step, network device 30, in one implementation, validates that the configuration information in the configuration message results in an operational configuration. For example, assume for didactic purposes that a second network device, operating in an unconfigured mode, is installed in network 50 on the communications path between network management system 43 and network 40. In this scenario, the second network device may capture the configuration message intended for network device 30. For didactic purposes, assume the following network topology:

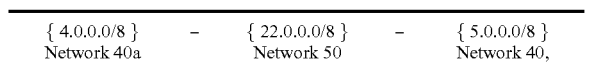

| { 4.0.0.0/8 } | – | { 22.0.0.0/8 } | – | { 5.0.0.0/8 } |
| Network 40a | | Network 50 | | Network 40, | where a network administrator accesses network management system 43 on network 40a to add a new network device 30 on network 40 to the configuration of network management system 43. The configuration message in the didactic example will necessarily pass through network 50, such as an Internet Service Provider network. If the network administrator uses the command (implemented via the CLI):

sys goose 5.1.1.2 255.0.0.0 gander 5.1.1.1 4.1.13.13
  admin 5.2.3.4, the configuration message passes through an unconfigured network device on network 50, creating the possibility that the configuration message will be unintentionally intercepted at network 50. As part of validating the configuration message, the unconfigured network device determines whether the gateway specified in the configuration message is on the same network as its new IP address. In one implementation, network device 30 broadcasts an Address Resolution Protocol (ARP) request to get the MAC address for its new gateway (here, router 22, having a configured IP address of 5.1.1.1). The unconfigured network device on network 50, employing this same validation mechanism, will try to resolve the gateway address of 5.1.1.1. The unconfigured network device on network 50 will fail to resolve the address of the gateway and, therefore, ignore the configuration message, allowing it to be forwarded along the path to network device 30. Another scenario that may be problematic is if a network administrator attempts to install one or more additional, unconfigured network devices on network 40, before completing the initial configuration of network device 30. While this may be uncommon in normal usage, network management system 43, in one implementation, discourages this practice by refusing to add to the pending list (see above) more than one new network device on the same subnet.

C. Alternative Embodiments

In an alternative implementation, the present invention can be used to facilitate the configuration of end-systems that are replacements to previously existing end-systems. For example, assume that an enterprise's mail server has failed. To replace the system, a user physically disconnects the obsolete or failed system from the network, and installs in its place an unconfigured server (in this example, server 44) onto network 40. The unconfigured server 44, in one implementation, includes standard functionality, such as at least one network interface controller, a motherboard, memory, a hard drive, an operating system and the like. Server 44 may or may not include application software. In addition, the unconfigured server 44 further includes configuration daemon 148 that, while server 44 is in an unconfigured mode, listens for configuration messages that are broadcast over network 40. In one implementation, server 44 may also include a DHCP client that obtains a dynamic IP address from a DHCP server associated with network 40.

Server 44 responds to the configuration message by initiating a connection to network management system 43, supplying during the connection a hardware profile detailing the hardware installed on server 44. For example, the hardware profile may detail the name and capacity of the hard drive, the amount of RAM, the name and image version of the operating system, and the like. In one implementation, the hardware profile is obtained by making standard API calls to the operating system. During the configuration connection, network management system 43 can compare the hardware profile transmitted by server 44 to a set of hardware profiles stored in a database accessible to network management system 43 to match server 44 to one of a plurality of known server types. This comparison yields the network device type (here, identifying server 44, which presumably has sufficient hardware capabilities to act as a mail server), allowing network management system 43 to select appropriate configuration information. For example, if network management system 43 identifies server 44 as being capable of supporting the mail server application, it retrieves the mail server software, and configuration settings for the mail server software, and transmits them to server 44 for installation. In one implementation, server 44 may also provide information characterizing the topology of network 40, such as the MAC addresses of neighboring end-systems, or the subnetworks to which server 44 is connected. By comparing this network topology information to a set of previously stored topology information (including the network topology information associated with the end system being replaced), network management system 43 can further distinguish server 44 from a plurality of similar or identical unconfigured servers installed on network 44, and therefore identify what previous hardware system server was intended to replace, allowing for identification of the application software and other configuration information to provide to server 44.

In another implementation, server 44 can obtain the network address of network management system 43 in other ways. For example, server 44 can obtain the network address of network management system 43 with the DCHP response transmitted by a DHCP server associated with network 40. For example, the DHCP response may include the network address of network management system 43 in a reserved field in the DHCP response. In other implementations, server 44 can broadcast requests for a configuration message on network 40 to identify a device that responds with the network address of network management system. In another implementation, a network device on network 40 may periodically broadcast a configuration message including the network address of network management system. In any of these implementations, server 44 can then use the information to establish a connection to network management system 43 and receive configuration information as discussed above.

Lastly, although the present invention has been described as operating in connection with end systems employing the TCP and IP protocols, the present invention has application in computer network environments employing any suitable transport layer and network layer protocols. Moreover, while the embodiments described above operate primarily to configure intermediate network devices, the invention can be used to remotely configure end systems by transmitting configuration messages to the broadcast address of the network on which the unconfigured network device is deployed. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. A method, comprising:
    monitoring, at a network device disposed on a communication path between a first network and a second network and operating in an unconfigured mode, messages transmitted from the first network to the second network;
    upon detecting at the network device a message transmitted from the first network to the second network, determining whether the message is a configuration message based on whether the message is a null service type Resource ReSerVation Protocol (RSVP) message;
    if the message is not a configuration message, then forwarding, at the network device, the message to the second network;
    if the message is a configuration message that comprises an Internet Protocol (IP) address for the network device and an IP address of a network management system disposed in the first network, then configuring, at the network device, the network device with the IP address for the network device; and
    switching the network device to a configured mode.

2. The method of claim 1, further comprising:
    transmitting, from the network device, a configuration request to the network management system using the IP address of the network management system in the configuration message.

3. The method of claim 2, wherein the configuration message further comprises a password for the network management system, further comprising:
    establishing a connection between the network device and the network management system using the password.

4. The method of claim 3, further comprising:
    receiving, at the network device, additional configuration information from the network management system; and
    further configuring, at the network device, the network device with the additional configuration information.

5. The method of claim 1, wherein the configuration message further comprises a time stamp, further comprising:
    validating, at the network device, the configuration message based on the time stamp before configuring the network device.

6. A method, comprising:
    monitoring, at a network device disposed on a communication path between a first network and a second network and operating in an unconfigured mode, messages transmitted from the first network to the second network;
    upon detecting a message transmitted from the first network to the second network at the network device, determining whether the message is a configuration message based on whether the message is a null service type Resource ReSerVation Protocol (RSVP) message;
    if the message is not a configuration message, then forwarding, at the network device, the message to the second network; and
    if the message is a configuration message that comprises configuration information for the network device, then validating the configuration message,
        if the configuration message is valid, then configuring the network device using the configuration information, and
        if the configuration message is invalid, then forwarding, at the network device, the configuration message to the second network.

7. The method of claim 6, wherein the configuration message comprises configuration information sufficient for the network device to establish a network connection to a network management device disposed in the first network.

8. The method of claim 7, wherein the configuration information comprises a network address for the network device, and a network address corresponding to the network management device.

9. The method of claim 6, wherein the configuration information is encrypted.

10. The method of claim 6, wherein
    the first network comprises a gateway router having a gateway network address;
    the network device is operably connected to the first network;
    the configuration message further comprises a network address; and
    validating the configuration message comprises determining whether the network address matches the gateway network address of the gateway router.

11. The method of claim 8, further comprising broadcasting an address resolution protocol request, including the network address for the network device and the network address corresponding to the network management device, on the network.

12. The method of claim 6, wherein the network device comprises a first network interface and a second network interface, and monitoring, at the network device, the messages transmitted from the first network to the second network comprises:
    intercepting, at the first network interface, a message transmitted from the first network to the second network; and if the message is not a configuration message, then passing the message to the second network interface for forwarding to the second network.

13. The method of claim 6, wherein the configuration information in the configuration message is encrypted, and validating the configuration message comprises decrypting the configuration information.

14. A method, comprising:
receiving, at a first network interface of a network device disposed on a communication path between a first network and a second network and operating in an unconfigured mode, a configuration message transmitted from the first network to the second network, wherein
the network device comprises the first network interface and a second network interface,
the network device is operably connected to the first network via the first network interface,
the network device is operably connected to the second network via the second network interface,
the network device is null-service-enabled,
the configuration message is a null service type Resource ReSerVation Protocol (RSVP) message, and
the configuration message comprises configuration information for the network device;
validating, at the network device, the configuration message;
if the configuration message is valid, then configuring the network device using the configuration information in the configuration message; and
if the configuration message is not valid, then passing the configuration message to the second network interface for forwarding to the second network 15. The method of claim 14, wherein the configuration information further comprises a network address of a network management system disposed in the first network, and the method further comprises:
establishing a connection to the network management system using the network address of the network management system.

16. A network device, comprising:
a first network interface;
a second network interface;
a processor;
a configuration interface module comprising computer-readable instructions operative to cause the processor to configure the network device based on received configuration information; and
a configuration daemon comprising computer-readable instructions operative to cause the processor, the first network interface, and the second network device to:
receive, at the first network interface, a configuration message transmitted from a first network to a second network by a network management system disposed in the first network and addressed to a configured destination host having a network address disposed in the second network, wherein the network device is disposed on a communication path between the first network and the second network;
validate the configuration message;
if the configuration message is valid, then invoke the configuration interface module to configure the network device using configuration information in the configuration message; and
if the configuration message is not valid, then pass the configuration message to the second network interface for forwarding to the destination host.

17. The network device of claim 16, wherein the configuration interface module is operative to configure the network device to communicate with the network management system using the configuration information in the configuration message.

18. In a network environment comprising a first network, a second network, and a network device disposed on a communication path between the first network and the second network, wherein the first network includes a gateway router allowing access to resources on at least the second network, and the network device, when operating in an unconfigured mode, is capable of intercepting messages transmitted from the second network to the first network, a method, comprising:
identifying a destination host on the first network, wherein the destination host is configured, has a network address, and is accessible to the resources on at least the second network, and the network device is unconfigured and inaccessible to the resources on at least the second network;
transmitting a configuration message from the second network to the first network, wherein the configuration message is addressed to the destination host, and is used for automatically configuring the network device after being intercepted by the network device.

19. The method of claim 18, wherein the configuration message is formatted in a manner that causes the destination host to ignore the configuration message.

20. The method of claim 18, wherein the configuration message is formatted in a manner that causes the destination host to discard the configuration message.

21. The method of claim 18, wherein the configuration message is formatted according to a protocol that is not implemented by the destination host.

22. The method of claim 18, wherein the configuration message is formatted according to a protocol that is not understood by the destination host.

23. The method of claim 18, wherein the configuration message comprises information sufficient for the network device to establish a network connection with a device on the second network.

24. The method of claim 23, wherein the configuration message further comprises a network address for the network device, a sub-network mask of the first network, a network address of the device on the second network, and a network address of the gateway router.

* * * * *